United States Patent [19]

Ophir et al.

[11] 4,286,455

[45] Sep. 1, 1981

[54] ULTRASOUND PHANTOM

[75] Inventors: Jonathan Ophir, Overland Park; Nabil F. Maklad, Lenexa; Paul M. Jaeger, Kansas City, all of Kans.

[73] Assignee: Acoustic Standards Corporation, Overland Park, Kans.

[21] Appl. No.: 36,016

[22] Filed: May 4, 1979

[51] Int. Cl.$^3$ ............................................. G01N 37/00
[52] U.S. Cl. ...................................... 73/1 DV; 73/644
[58] Field of Search ...................... 73/1 R, 1 DV, 644

[56] References Cited

U.S. PATENT DOCUMENTS

| 3,175,106 | 3/1965 | Sansom et al. | 73/644 X |
| 4,116,040 | 9/1978 | Schoxnecht et al. | 73/1 R |

OTHER PUBLICATIONS

"Pulse-Echo Ultrasonic Transducer Characterization", *IEEE* Transactions on Sonics and Ultrasonics, vol. SU-26, No. 1, Jan. 1979.
"Tissue Mimicking Materials for Ultrasound Phantoms", *Med. Phys.* 5(5), Sep./Oct. 1978.
"Wisconsin Ultrasound Tissue Phantoms", Radiation Measurements Incorporated, 1977.
"Speed of Sound in NaCl, MgCl$_2$, Na$_2$SO$_4$, and MgSO$_4$ Aqueous Solutions as Functions of Concentration, Temperature, and Pressure", *J. Acoust. Soc. Am.*, vol. 63, No. 6, Jun. 1978.

*Primary Examiner*—Charles A. Ruehl
*Attorney, Agent, or Firm*—Schmidt, Johnson, Hovey & Williams

[57] ABSTRACT

An ultrasound phantom is provided which has ultrasound wave velocities, attenuation coefficients and scattering coefficients which closely mimic those of human tissue and which permits diagnostic ultrasound equipment to be accurately tested and calibrated on a continuing day-to-day basis. The phantom preferably includes a substantially air-tight enclosure or box, having therein a quantity of reticulated synthetic resin foam material and a salt water solution. The ultrasonic characteristics of the phantom are completely uniform, stable and reproduceable, can be varied at will by using different foam materials and/or liquids, and the phantom can be stored and used at room temperature without degradation thereof. Localized zones having different ultrasonic qualities for mimicking various normal and pathological tissues can also be provided by hollowed, cut-out regions within the foam material, with different inserts located within certain of the hollowed regions.

13 Claims, No Drawings

ULTRASOUND PHANTOM

BACKGROUND OF THE INVENTION

1. Field of the Invention

The present invention is broadly concerned with ultrasound phantoms which are used to test the accuracy of and to calibrate ultrasonic diagnostic equipment presently in use by many hospitals and doctors. More particularly, it is concerned with an ultrasound phantom which has ultrasound characteristics (i.e., the transmission pattern of ultrasonic waves directed therethrough) in a manner to closely mimic the transmission pattern of similar ultrasonic waves directed through one or more portions of the human body; i.e., important ultrasound characteristics such as wave velocities, and attenuation and scattering coefficients of the phantom of the invention are very similar to those of human tissue.

2. Description of the Prior Art

Although diagnostic ultrasound equipment has been in use for a number of years, a persistent problem has plagued both the designers and users of such equipment. Specifically, a truly stable and uniform ultrasound phantom has not been available for calibrating and checking the equipment on a regular basis. Similarly, a tissue-mimicking ultrasound phantom having necessary stability and uniformity qualities has not heretofore been produced. Ideally, such a tissue-mimicking phantom should have the same ranges of uniform velocities of sound, attenuation coefficients, and scattering coefficients as human tissue, although for calibration purposes exact tissue-mimicking characteristics are not absolutely necessary.

A number of attempts have been made in the past to provide an effective ultrasound phantom. One such attempt is described in an article entitled "Tissue Mimicking Materials For Ultrasound Phantoms", by Ernest L. Madsen et al., Med. Phys., 5 (5), September/October 1978. In the phantoms described in this article, water-based pharmaceutical gels containing uniform distributions of graphite powder and known concentrations of alcohol are employed. One drawback in this type of ultrasound phantom stems from the fact that the graphite tends to settle out at temperatures over 90° F., thus irreversably altering the ultrasound properties of the phantom. Moreover, many gels employed can be unstable under certain conditions, primarily due to bacterial attacks on the gel and ambient temperature variations, thus leading to degradation of the gel and consequent failure of the phantom. Finally, it is difficult to achieve and maintain a uniform dispersion of the graphite, and to incorporate zones therein for the mimicking of cysts or the like.

Another known ultrasound phantom produced by researchers at the University of Colorado employs a base of silicone polymer combined with mineral oil, polystyrene or glass beads embedded therein. Various other substances are being investigated as phantom materials, and these include soft plastics such as plastisols, or urethane polymers. However, the phantoms produced to date are generally deficient in one or more important respects. For example, it is very difficult to remove air bubbles from the material and achieve reproducibly uniform concentrations of scattering particles.

SUMMARY OF THE INVENTION

A greatly improved ultrasound phantom is provided by the present invention. Broadly speaking, the phantom comprises a substantially airtight enclosure having therewithin means for altering the characteristics of ultrasonic waves directed therethrough to give desired transmission patterns. Preferably, the pattern-altering means is designed to be tissue-mimicking, i.e., the pattern mimics the transmission pattern of similar ultrasonic waves directed through one or more portions of the human body. The pattern-altering means desirably includes a quantity of a cellular foam material, and a fluid such as an aqueous liquid dispersed throughout the material.

In practice, it has been found that an open-cell reticulated foam material is particularly advantageous. Such material should normally have a porosity of from about 5 to 100 pores per linear inch and be of yieldable, but substantially shape-retaining physical characteristics, along with a solution (most preferably about 0.8 Molar) of sodium chloride and water. This liquid component is characterized by the property that ultrasound waves travel therethrough at an average velocity of about 1540 meters per second. The attenuation and scattering coefficients of the overall phantom closely mimic those of human tissue at all diagnostically used frequencies (1-10 Megahertz).

Zones of differing transmission pattern characteristics can be provided as desired in the phantom simply by forming hollowed regions in the foam which can be either left hollow or filled with an insert, such as a foam (reticulated or otherwise) having a different bulk density and/or porosity than the surrounding foam. In this way the ultrasound characteristics of vessels, cysts, tumors and different types of tissues found in the human body can be closely mimicked.

DESCRIPTION OF THE PREFERRED EMBODIMENT

The most preferred ultrasound phantom of the invention is in the form of a rectangular box-like enclosure formed of a plastic material such as plexiglas. The box is sealed and substantially air-tight, inasmuch as air bubbles within the liquid of the phantom can create a significant degree of unwanted attenuation and scattering. The box lid is preferably provided with a depression therein for receiving a small quantity of a material such as mineral oil. The ultrasound probe is placed within the oil which serves as an acoustic couplant between the transducer of the transducer of the diagnostic equipment and the box lid. The preferred reticulated material is advantageously formed from a synthetic resin foam material, most preferably a polyurethane foam material. The reticulated material should have a porosity from about 5 to 100 pores per linear inch, (p.p.i.), more preferably from about 15 to 25 p.p.i., and most preferably about 20 p.p.i. In practice, commercially available reticulated, open cell polyurethane foam materials of dodecahedral network or lattice configuration has been used to good effect.

The fluid component of the phantom is dispersed throughout the foam material and preferably includes an aqueous liquid such as a solution of sodium chloride in water. In the case of a tissue-mimicking phantom, the fluid should be characterized by the property that ultrasound waves travel therethrough at an average speed approximately equal to the ultrasound velocity of a desired portion of the human body. With respect to soft human tissue, this speed has been measured at about 1540 meters per second, although this speed may vary in different portions of the human body. It will be understood however, that a wide variety of liquids can be employed in the invention in view of the desired speed characteristics. To give but one example, ultrasound speed can be altered simply by changing the concentration of the sodium chloride solution used in the most preferred form of the invention. Other types of fluids may react with and/or swell the foam, which also alters the resultant ultrasound characteristics of the phantom.

The preferred salt solution is also advantageous inasmuch as it does not chemically or ultrasonically react with the synthetic resin foam material. Thus, there is no degradation of the ultrasound properties of the phantom over time. Nevertheless, it is normally desirable to add a small amount of a biocide with the salt solution so that the growth of bacteria within the liquid fraction of the phantom is essentially completely eliminated.

By virtue of the easy workability of the preferred reticulated foam material, it is possible to provide certain regions within the phantom to serve to mimic the ultrasound characteristics of specific parts or conditions found in the human body. For example, it is often desirable to have zones within a phantom which mimic the ultrasound characteristics of vessels, cysts or tumors found in the human body. To this end, thin wall, semirigid plastic tubing can be inserted within the foam material to mimic the ultrasound characteristics of vessels or sacs. Hollow, fluid-filled, cut-out regions can be provided for mimicking the ultrasound characteristics of cysts; and tumors can be mimicked by initially hollowing regions in the foam, and inserting pieces of similar reticulated foam having different bulk densities and/or porosities than of the surrounding foam. In practice, reticulated foams having from about 15 to 45 p.p.i. have been used for this purpose.

Tissue-mimicking ultrasound phantoms in accordance with the present invention have been produced in the following manner. First a rectangular box formed of ⅜" thick plexiglas with a removable, gasketed lid was provided. A rectangular section of reticulated open-cell synthetic foam cut from a large bun thereof to snugly fit within the plexiglas box. The Scott industrial foam and the "Velve" product (both 20 p.p.i.) have been used.

The foam was then modified as desired by cutting hollow regions out of the foam, placing different bulk density reticulated foam inserts and tubes in certain of the regions, and inserting reference wires through the foam. Such modifications serve to alter the transmission pattern of ultrasonic waves directed therethrough in a manner different from the pattern alteration effected by the remainder of the foam, and can be used to mimic the ultrasound characteristics of desired parts or conditions found in the human body, and to perform quantitative measurements of sound velocity, scattering and attenuation.

The modified foam is next rinsed thoroughly with hot water and placed within the plexiglas box. The box is then placed in a vacuum chamber (with the top removed) and the chamber is evacuated, using an aspirator pump. A separate line to the vacuum chamber is used to deliver boiling water to the bottom of the chamber, and this is continued until the water level is at least one or two inches above the upper margin of the box. After the water has cooled to room temperature, the pressure within the chamber is equalized with ambient, and the top of the vacuum chamber is removed.

In order that the liquid within the chamber is characterized by the property that ultrasound waves travel therethrough at an average speed about equal to the velocity of similar waves through human tissue (approximately 1540 meters per second), 45 grams per liter of sodium chloride is added to the box to create a 0.8 Molar solution of salt water therein.

Salt addition is accomplished by mixing 160 grams of sodium chloride and about 1 liter of water, followed by boiling for several minutes to remove air bubbles. This solution is carefully siphoned into the box. Inasmuch as the salt solution has a density of about 1.1 gr/ml, it sinks to the bottom of the box and displaces the fresh water. The penultimate step involves adding about 1 milliliter of an effective biocide (e.g., "Bath-Kleer" sold by Instrumentation Laboratory, Lexington, Mass.) per liter of solution, in order to eliminate bacterial growth within the phantom. The top of the box is then attached underwater to completely seal the box. At this point the completed phantom may be removed from the vacuum chamber and is ready for use.

Phantoms in accordance with the invention are extremely stable over time and do not significantly change in terms of ultrasound velocity, attenuation and scattering characteristics. Moreover, the temperature stability thereof allows the phantoms to be easily stored and used without special precautions. In the case of the phantoms produced using the Scott reticulated foam, an attenuation coefficient of about 3.25 dB/cm (at 3.5 MHZ) was measured. The speed of ultrasonic waves through the phantom was about 1540 meters per second.

The attenuation coefficient of the phantom was found to obey a power law behavior, i.e., the attenuation coefficient equals $KF^x$, when f is frequency and K and x are constants. The value of x ranges from about 1 to 1.5. This is a fair approximation of the attenuation coefficient of human tissue. The temperature dependence of the attenuation coefficient was found to be about minus 0.04 dB/cm/° C. at 3.5 Megahertz; the temperature dependence of velocity was about 3.0 meters/ second/° C. The dynamic range of scattered echoes was about 6 to 8 dB.

A number of distinct advantages are inherent in phantoms in accordance with the invention. For example, the essential uniformity of synthetic resin foam allows production of a phantom which can be dependably used as a calibrated test object, so that diagnostic ultrasound equipment can be checked on a day-to-day basis. This fact also eliminates the need for critical dispersion of scattering objects throughout the phantom. Furthermore, the use of a fluid in the phantom (as opposed to a gel, for example) allows void-free filling of the foam and surrounding container, to thus eliminate the presence of air bubbles which are extremely detrimental in ultrasound phantoms. The most important ultrasound characteristics of the phantom, i.e., speed of sound therethrough, attenuation coefficient and scattering can also be independently altered. That is to say, speed of sound can be changed by, for example, changing the fluid or concentration of components therein; the attenuation coefficient can be modified by employing a different foam having an altered bulk density; and scattering can be changed by choosing a foam having a different porosity. Thus, ultrasound phantoms can be produced having desired ultrasound characteristics without sacrifice of uniformity or longevity. Of course a wide variety of other objects such as rubber ultrasonic absorbers or wire reflectors can be located within the phantom at the discretion of the user. Finally, the shape-retaining nature of the preferred foam material allows formation of wall-less hollowed regions for cyst-mimicking (which is difficult with gels) and also permits incorporation of motion-creating apparatus for alternately compressing the foam and then allowing the foam to expand and return to its original configuration.

Having thus described the invention, what is claimed as new and desired to be secured by Letters Patent is:

1. An ultrasound phantom comprising:
   a substantially air-tight enclosure;
   means within said enclosure for altering ultrasonic waves directed therethrough in a manner to yield desired ultrasound characteristics,
   said wave-altering means including a quantity of a cellular foam material, and a fluid dispersed throughout said material.

2. The phantom as set forth in claim 1 wherein said fluid is a liquid.

3. The phantom as set forth in claim 2 wherein said liquid is an aqueous liquid.

4. The phantom as set forth in claim 3 wherein said liquid comprises a solution of sodium chloride in water.

5. The phantom as set forth in claim 1 wherein said fluid is characterized by the property that ultrasound waves travel therethrough at an average speed of about 1540 meters per second.

6. The phantom as set forth in claim 1 wherein said quantity of material is substantially shape-retaining.

7. The phantom as set forth in claim 1 wherein said material is a reticulated, open cell foam.

8. The phantom as set forth in claim 7 wherein said material has a porosity of from about 5 to 100 pores per linear inch.

9. The phantom as set forth in claim 8 wherein said porosity is about 20 pores per linear inch.

10. The phantom as set forth in claim 9 wherein said foam material is a polyurethane foam.

11. The phantom as set forth in claim 1 there being a hollowed region in said material for altering the characteristics of ultrasound waves passing through the hollowed region in a manner different from the alteration effected by other portions of said material.

12. The phantom as set forth in claim 11 including an insert within said hollow region which has a different density and/or porosity than that of the majority of said quantity of material.

13. The phantom as set forth in claim 1 wherein said enclosure includes a lid having structure defining a couplant-receiving depression in the lid for receiving a material which serves as an ultrasound couplant.

* * * * *